United States Patent [19]

Kihara et al.

[11] Patent Number: 5,058,111
[45] Date of Patent: Oct. 15, 1991

[54] SUBSCRIBER LINE INTERFACE CIRCUIT IN A SWITCHING SYSTEM

[75] Inventors: Kouichi Kihara; Kazushige Yamamoto, both of Tokyo, Japan

[73] Assignee: Oki Electric Industry Co., Ltd., Tokyo, Japan

[21] Appl. No.: 537,565

[22] Filed: Jun. 13, 1990

[30] Foreign Application Priority Data

Jun. 19, 1989 [JP] Japan .................................. 1-156292
Nov. 20, 1989 [JP] Japan .................................. 1-299551

[51] Int. Cl.⁵ ............................................. H04J 03/24
[52] U.S. Cl. .................. 370/94.1; 370/060; 370/60.1; 370/94.2
[58] Field of Search ............ 370/60, 60.1, 94.1, 370/94.2

[56] References Cited

U.S. PATENT DOCUMENTS

| 4,317,195 | 2/1982 | Barberis et al. | 370/60 |
| 4,453,247 | 6/1984 | Suzuki et al. | 370/94.2 |
| 4,486,878 | 12/1984 | Havermans | 370/60 |
| 4,598,400 | 7/1986 | Hillis | 370/94.1 |
| 4,774,706 | 10/1986 | Adams | 370/94.1 |
| 4,802,161 | 1/1989 | Byars et al. | 370/94.2 |
| 4,885,744 | 12/1989 | Lespagnol et al. | 370/94.1 |
| 4,975,906 | 12/1990 | Takiyasu et al. | 370/94.1 |

FOREIGN PATENT DOCUMENTS

| 0068865 | 1/1983 | European Pat. Off. . |
| 0241152 | 10/1987 | European Pat. Off. . |
| 84/03191 | 8/1984 | World Int. Prop. O. . |

Primary Examiner—Douglas W. Olms
Assistant Examiner—Dang Ton
Attorney, Agent, or Firm—Spencer & Frank

[57] ABSTRACT

A subscriber line interface circuit in a packet switched network is capable of reducing the S/N ratio. Voice signals are transmitted and received as analog signals via line terminal circuits which are corrected to respective packet communication signal processing circuits but not to a common bus. In the packet communication signal processing circuits, packet assembly and disassembly, voice signal processing, and line terminal circuit control are carried out in synchronism with the packet communication network. Packet data are transferred serially between the packet communication signal processing circuits and a switch interface circuit.

6 Claims, 14 Drawing Sheets

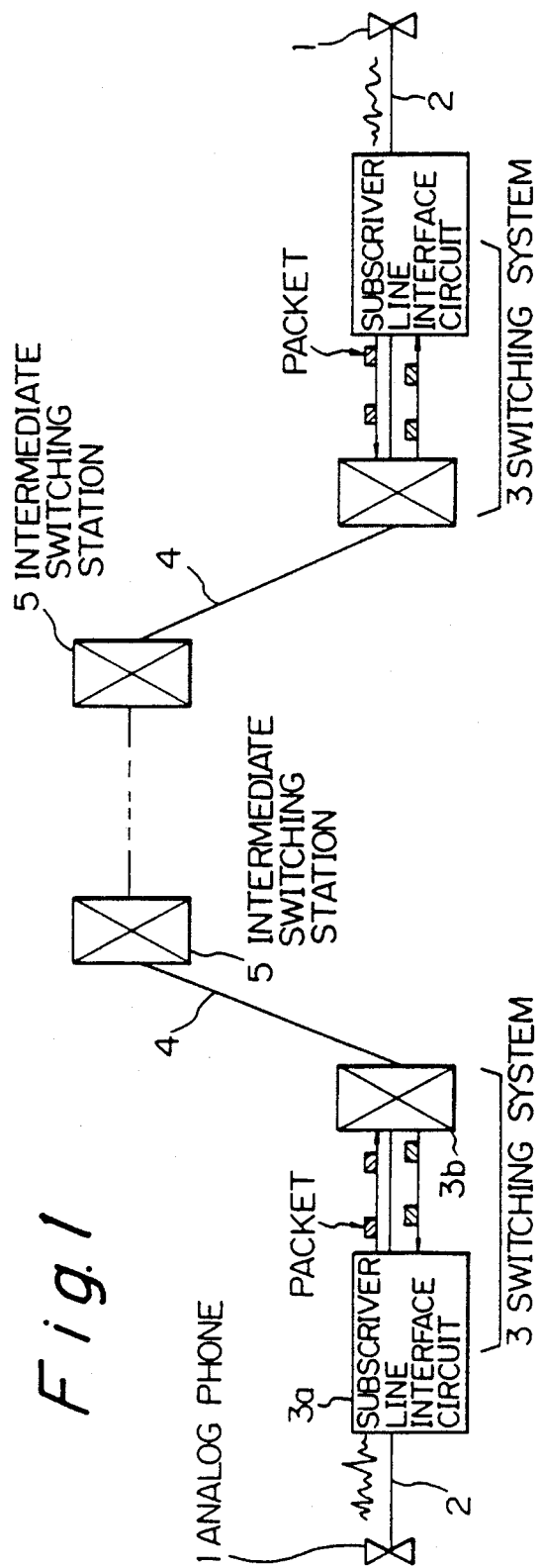

50 SERIAL SENDING INTERFACE CIRCUIT

SUBSCRIBER LINE INTERFACE CIRCUIT IN A SWITCHING SYSTEM

BACKGROUND OF THE INVENTION

The present invention relates to a subscriber line interface circuit in an asynchronous transfer mode switching system, and particularly to a packet communication signal processing circuit for assembling and disassembling packets and processing voice signals and to a digital signal processor employed in a packet communication switching system. Diversified media having different speeds and protocols, such as audio, data, viedo and the like, can be switched and processed by packet communication to realize a multimedia communication system. Voice and video signals have characteristics which vary momentarily in the quantity of information they carry, and hence the amount of information transmitted can be varied dynamically in response to the characteristics of the signals to achieve transmission with high efficiency.

Voice signals in a packet communication network will be described with reference to FIG. 1.

The voice signal from an analog phone 1 is transmitted via a subscriber line 2 to a switching system 3, composed of a subscriber line interface circuit 3a and a switch circuit 3b. The voice analog signal is assembled as a packet at the subscriber line interface circuit 3a and an output from the switch circuit 3b to a high speed digital line 4. The packet assembled at the switching system 3 serving the calling party is transmitted to a switching system 3 serving the called party by way of a plurality intermediate switching stations 5. The packet is then disassembled to reproduce the voice analog signal, which is supplied to the analog phone 1 of the called party.

The format of the packet is illustrated in FIG. 2.

The packet format PAC provides for a header HEA and an information portion INF. The header HEA is composed of the address of the called party and the properties of the packet. The information portion INF is composed of pulse-code modulated voice data (e.g. CCITT recommendation G711, G721).

The basic arrangement of a conventional subscriber circuit in a switching system 3 will be described with reference to FIG. 3. The subscriber line interface circuit package accomodates m number of subscriber lines.

The subscriber line interface circuit package 10 comprises a microprocessor 11, a buffer memory 12, a direct memory access controller DMAC 13, a switch interface circuit SWINF 14, a bus arbitrary circuit BUSARB 15, an internal common bus 16, a clock generator 17, a plurality of line terminal circuits $18_1$- $18_m$ (m in number in this case, hereinafter referred to as BORSCHETs) and a plurality of digital signal processors DSP $19_1$-$19_m$ (m in number in this case).

Each of the BORSCHTs $18_1$-$18_m$ is connected to each of subscriber lines $20_1$-$20_m$. In detail, a BORSCHT comprises a battery feed circuit, an ovevoltage protection circuit, a ring circuit, a supervision circuit, a coding-decoding circuit, a hybrid circuit and a testing circuit. Analog voice signals supplied by the subscriber lines $20_1$ to $20_m$ are converted to PCM voice signals which are supplied to the digital signal processors $19_1$-$19_m$. Similarly, PCM voice signals supplied by the digital signal processors $19_1$- $19_m$ are converted to the analog signals which are supplied to the subscriber lines $20_1$ to $20_m$. The battery feed circuit, the ring circuit, and the supervision circuit are operated under the control of the microprocessor 11. Each of the digital signal processors $19_1$- $19_m$ serves to assemble or disassemble packets and subjects voice signals to various signal processings. The digital signal processors $19_1$- $19_m$ supply the packets assembled inside thereof to the buffer memory 12 by way of the internal common bus 16, and hence the assembled packets are stored in the buffer memory 12. The microprocessor 11 is informed of the storage of the assembled packets in the buffer memory 12. On the other hand, when a packet is received by the subscriber line interface circuit package 10, the digital signal processors $19_1$ to $19_m$ are informed of the reception of the packet by the microprocessor 11. The digital signal processors $19_1$- $19_m$, after being informed of the reception of the packet, extract the received packet from the buffer memory 12.

The buffer memory 12 temporarily stores the packet data at the time when the packet data is transferred between the data signal processors $19_1$- $19_m$ and the switch interface circuit 14. The switch interface circuit 14 interfaces between the switch circuit and the buffer memory 12. The direct memory access controller 13 serves to control data transfer between the buffer memory 12 and the switching interface circuit 14 upon reception of an instruction from the microprocessor 11. The bus arbitrary circuit 15 is a contention control circuit for transferring the data in the subscriber line package 10 by way of the internal common bus 16.

The microprocessor (central processing unit) 11 subjects the digital signal processor $19_1$-$19_m$ and the BORSCHTs $18_1$ to $18_m$ to various call progresses and controls the transfer of packet data between the switching interface circuit 14, the buffer memory 12 and the digital signal processors $19_1$- $19_m$.

FIG. 4 is a view showing the process of generation and transmission of packets by the subscriberline interface circuit 10.

The analog voice signal generated at the terminal on the transmitting side is illustrated in FIG. 4(A). As is evident from the waveform in FIG. 4(A), voice periods and silence periods are mixed. The digital signal processor 19 in the subscriber line interface circuit of the calling party identifies voice or silence periods in the analog voice signal. Only the signal during the voice periods is packetized, as illustrated in FIG. 4(B). The voice period units are identified as Tn (n is 1, 2, ... 5); It is recognized that about 50% of a call between subscribers, on the average is in a non-conversation state. Hence, compressing the silence periods promotes the efficient use of the lines of the packet switched network (asynchronous communication network) and the packet switch circuit.

The buffer memory stores voice data at least for one packet to permit the voice periods to be discriminated or distinguished from the silence periods. That is, a voice or silence period is discriminated after the voice data for one packet is stored, and the stored packet is discarded in the case of a silence period. A near-end echo genereted by the hybrid circuit in a BORSCHT 18 can be cancelled by the digital signal processor 19. Furthermore, to code the voice signal for reducing the information quantity, the voice signal can be subjected to a voice band-width compression signal processing procedure and an adaptive differential PCM signal or the like can be used.

As is evident from a comparison of FIG. 4(B) and FIG. 4(C), the receiving or addressed packets P1r, P2r, ... do not arrive at given intervals due to delay variations even if the sending or addressing packets P1, P2, ... are transmitted at given intervals. Each packet is subjected to queuing control when it passes the switch circuit in a packet switched network, and the queuing time is momentarily varied in response to the traffic carried by the packet switched network. Moreover, packets do not always pass along the same intermediate route when they are transmitted from the subscriber line interface circuit at the calling party to that of the called party. To absorb the delay variations, it is effective to store the packets in the buffer memory. However, the following problems in the subscriber line interface circuit occur.

A sampling clock signal used in the coding decoding circuit in the BORSCHTs $18_1$ to $18_m$ is asynchronous with respect to the frequency generated by the clock generator 17 for supplying a system clock signal to each digital signal processor $19_1$ to $19_m$. This reduces the signal-to-noise ratio (S/N ratio) both in the analog/digital and the digital/analog conversions.

In the coding circuits of the BORSCHTs $18_1$ to $18_m$, the analog signal is converted to $\mu$-law PCM data or A-law PCM data (CCITT recommendation G711) as a logarithmic compression code which is converted to a linear code in the digital signal processors $19_1$ to $19_m$. The analog signal is not directly converted to the linear code as set forth above, which reduces the deterioration of the S/N ratio.

The data transfer in the subscriber line interface circuit package 10 involves the buffer memory 12, the direct memory access controller 13, and the bus arbitrary circuit 15, which enlarges the scale of the subscriber circuit Furthermore, the control of the BORSCHTs $18_1$ to $18_m$ by the microprocessor 11 involves a register for holding a control signal supplied by the microprocessor 11, which enlarge the scale of the subscriber line circuit.

Additionally, a complicated process is needed to transfer the data in the subscriber line interface circuit package 10, namely, two stages transfer from or to the buffer memory 12, which lowers the effective processing capacity of the digital signal processors $19_1$ to $19_m$.

SUMMARY OF THE INVENTION

To solve the problems of the convertional subscriber circuit set forth above, it is an object of the present invention to provide a subscriber circuit in the switching system capable of reducing the S/N ratio both in the analog/digital and digital/analog conversions to increase the usable information.

It is another object of the present invention to provide a subscriber line interface circuit in the switching system capable of transferring a packet data effectively between the subscriber line interface circuit and external equipment with a simple procedure.

It is a further object of the present invention to provide a subscriber line interface circuit with a digital signal processor having an improved processing capacity for assembling and disassembling the packet.

It is a still further object of the present invention to provide a small scale subscriber line interface circuit in the switching system.

To achieve the above objects, the subscriber line interface circuit in the switching system according to the present invention comprises:

(a) a plurality of line terminal circuit (hereinafter referred to as BORSCHTs) for subjecting subscriber lines to a terminal processing;

(b) a plurality of packet communication signal processing circuits for receiving and sending an analog voice signal from and to the plurality of BORSCHTs, assembling and disassembling packets processing voice signals, controlling the plurality of BORSCHTs and effecting contention control of the transmission and reception of the packet data in synchronism with a communication network;

(c) a switch interface circuit connected with the plurality of the packet communication signal processing circuits for interfacing packet data between a switching circuit of a switching system and the plurality of packet communication signal processing circuits; and (d) a central processing unit for controlling the plurality of packet communication signal processing circuits.

The packet communication signal processing circuit in the subscriber line interface circuit set forth above comprises:

(a) a digital signal processor for assembling and disassembling the packets; processing the voice signals, controlling the respective BROSCHT and effecting contention control of the transmission and reception of the packet data;

(b) an AD-DA converter for converting an analog signal supplied by the BORSCHT into a digital signal which is supplied to the digital signal processor and for converting a digital signal supplied by the digital signal processor to an analog signal which is supplied to the BORSCHT; and (c) a phase locked loop circuit for supplying a signal synchronous with the communication network to the digital signal processor.

BRIEF DESCRIPTION OF THE DRAWINGS

FIG. 1 is a view showing the flow of an voice signals in a packet switched networks;

FIG. 2 is a view showing a packet format;

DESCRIPTION OF THE PREFERRED EMBODIMENT

As will be described in detail hereinafter with reference to FIGS. 5 to 15, an arrangement of a subscriber line interface circuit in a switching system according to a preferred embodiment of the present invention comprises a subscriber line interface circuit package having packet communication signal processing circuits each of which include, a digital signal processing processor and a phase locked loop circuit. The digital signal processor includes an address generating circuit, a serial receiving interface circuit, a serial sending interface circuit and a parallel port interface circuit.

SUBSCRIBER CIRCUIT PACKAGE

Figure 3:
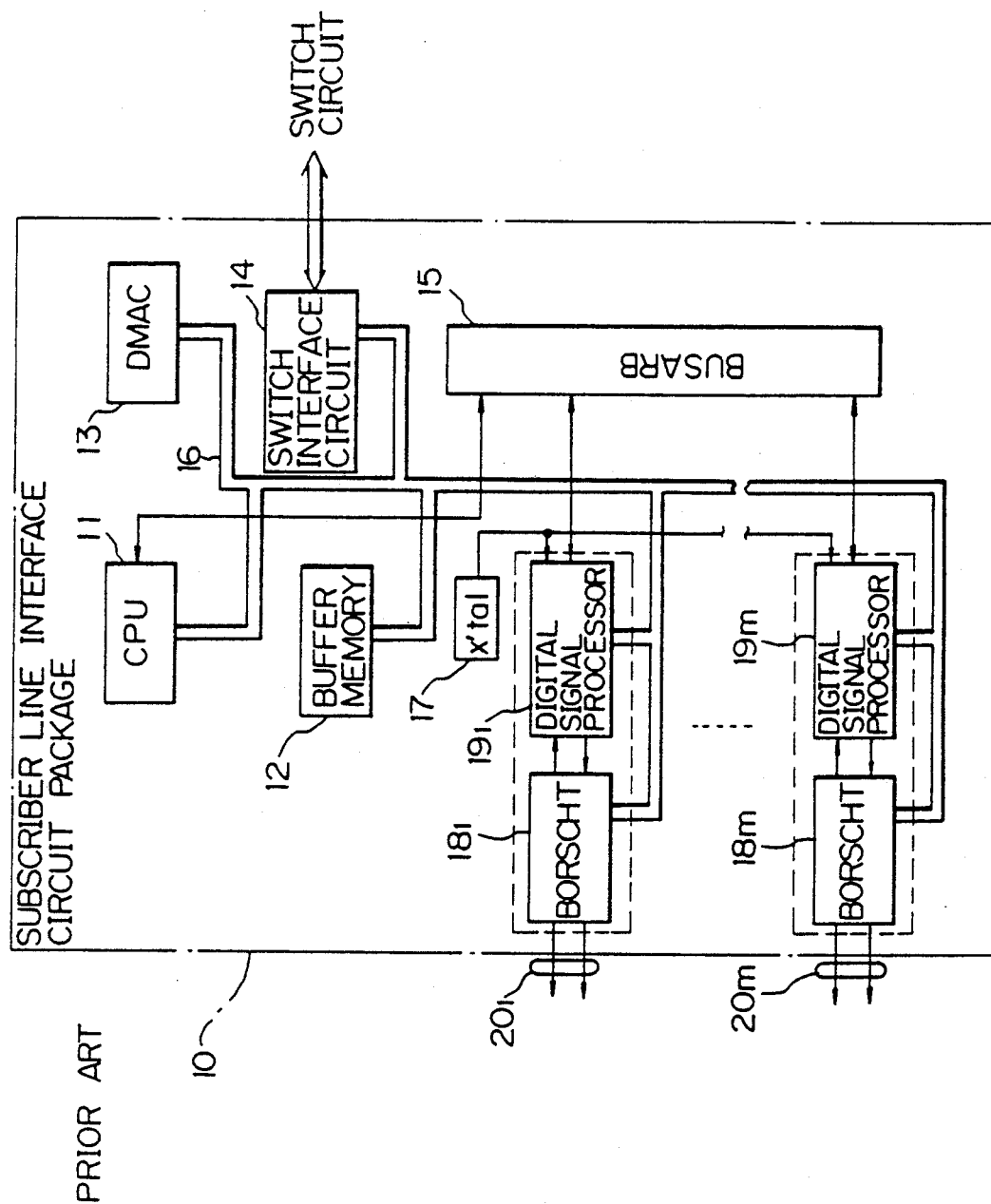
FIG. 3 is a block diagram showing a conventional subscriber line interface circuit package.
Figure 4:
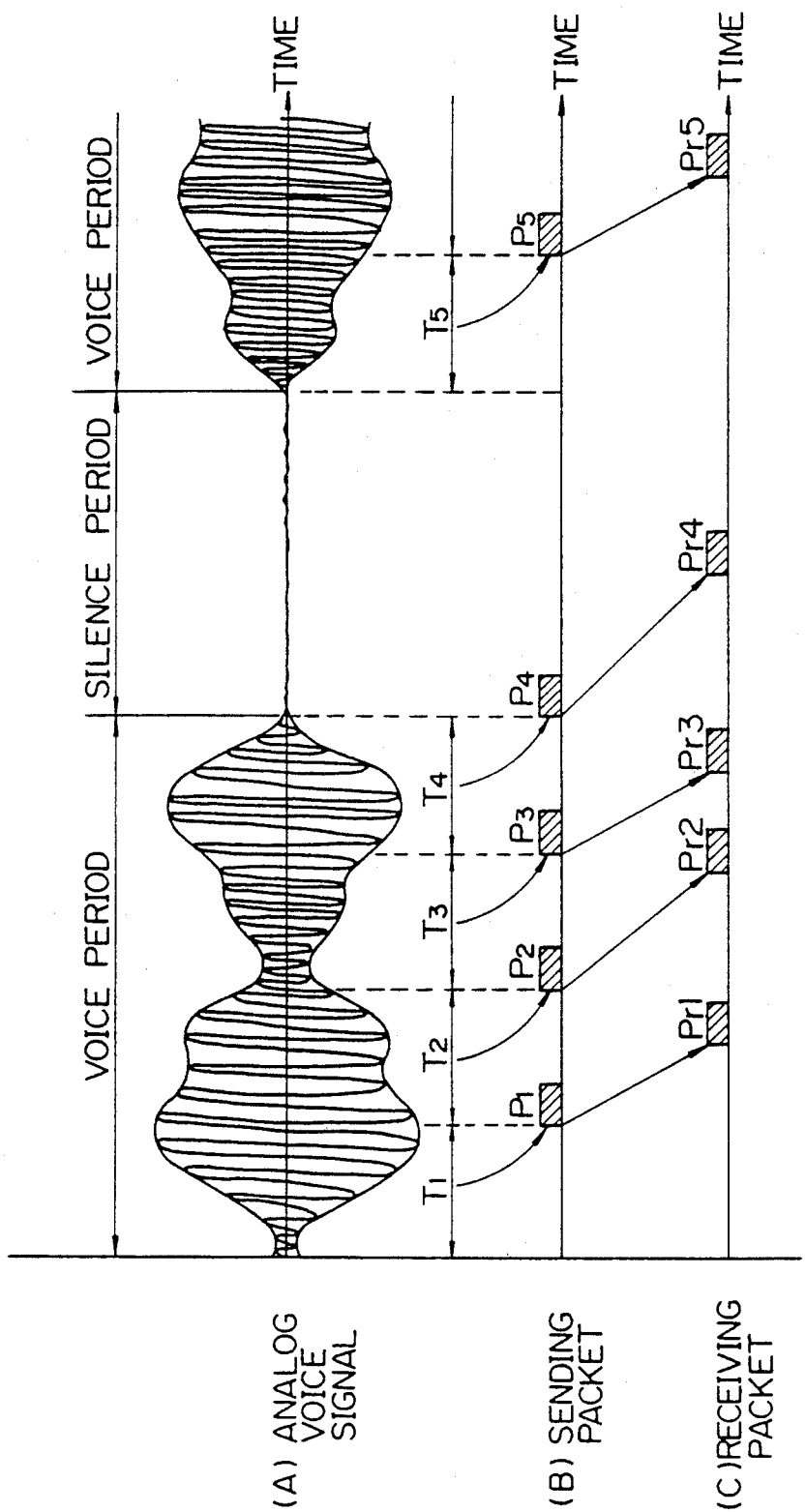
FIG. 4 shows signal waveforms and is provided for assistance in explaining the generation and transmission of packets.
Figure 5:
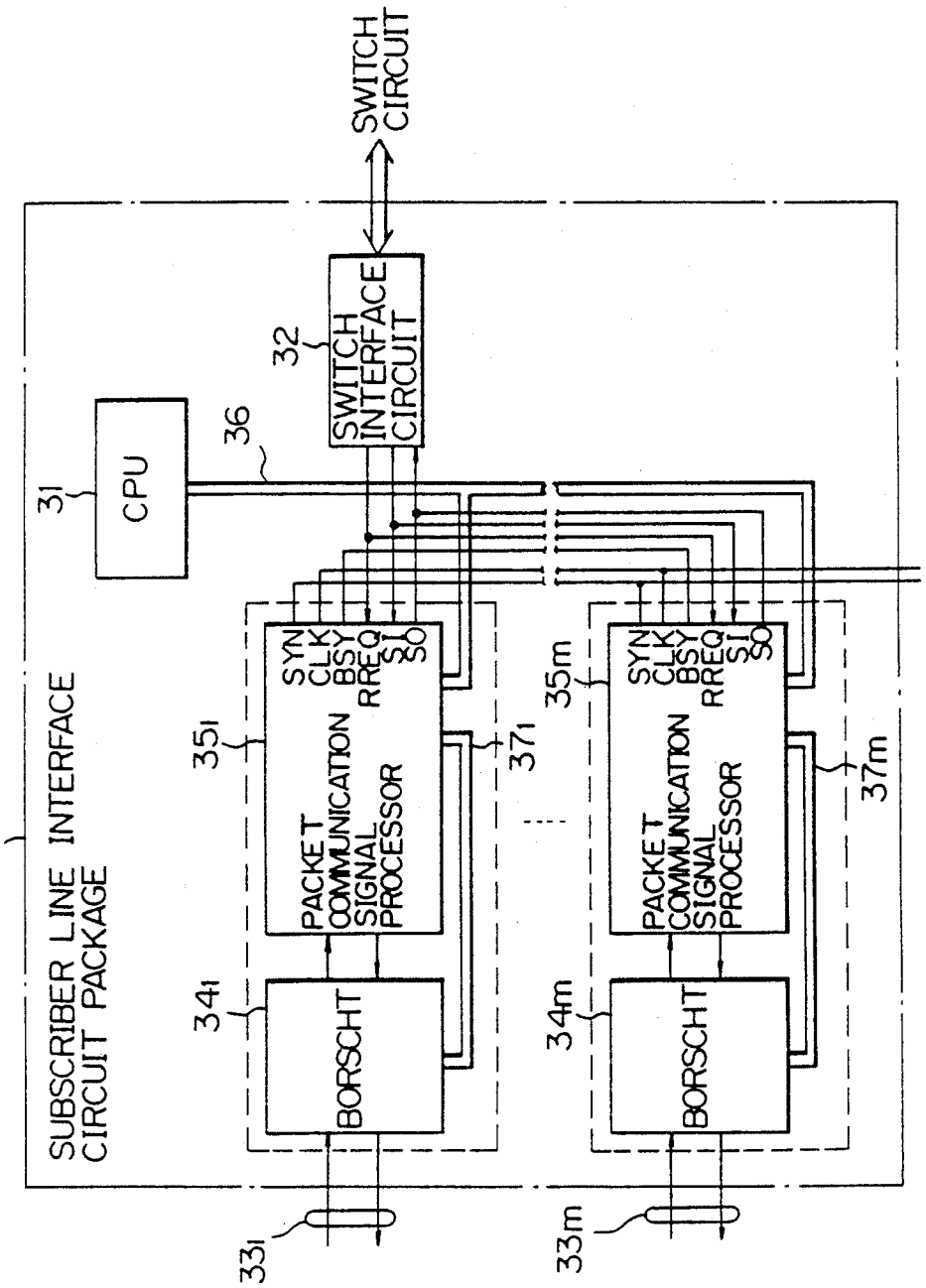
FIG. 5 is a block diagram showing a subscriber line interface circuit package according to an embodiment of the present invention.

FIG. 5 is a block diagram showing a subscriber line interface circuit package 30 having m subscriber lines and corresponding to the subscriber line interface circuit 3a as illustrated in FIG. 1.

The subscriber line interface circuit package 30 comprises a microprocessor CPU 31, a switch interface circuit 32 for interfacing with the switch circuit in the switching system as illustrated in FIG. 1, line terminal circuits or so-called BORSCHTs $34_1$ to $34_m$ for subjecting subscriber lines $33_1$ to $33_m$ to terminal processing and packet communication signal processors $35_1$ to $35_m$ for assembling and disassembling the packets and processing voice signals.

The switch interface circuit 32 is not connected with a system bus 36. According to the present invention, each of the packet communication signal processing circuits $35_1$ to $35_m$ and the switch interface circuit 32 serially receive and send data directly without using the system bus 36. The packet communication signal processing circuits $35_1$ to $35_m$ have input and output lines for serial data which are multiconnected (wire ORed).

Furthermore, the line terminal circuits or BORSCHTs $34_1$ to $34_m$ are not connected with the system bus 36. The BORSCHTs $34_1$ to $34_m$ are connected with the corresponding packet communication signal processing circuits $35_1$ to $35_m$ by way of local buses $37_1$ to $37_m$. That is, each of the packet communication signal processing circuits $36_1$ to $36_m$ finally controls one of the line terminal circuits $34_1$ to $34_m$. Each of the packet communication signal processing circuits $35_1$ to $35_m$ also effects a call control progress.

The voice signals are sent and received as analog signals between packet communication signal processing circuits $35_1$ to $35_m$ and the corresponding BORSCHTs $34_1$ to $34_m$. Accordingly, the BORSCHTs $34_1$ to $34_m$ each employs a analog processing arrangement. In more detail, a BORSCHT comprises a battery feed circuit, an overvoltage protection circuit, a ring circuit, a supervision circuit, a coding decoding circuit, a hybrid circuit and a testing circuit.

The operation of the subscriber line interface circuit package 30 will now be described.

The operating modes of the packet communication signal processing circuits $35_1$ to $35_m$ provided for the corresponding subscriber lines $33_1$ to $33_m$ are determined by the instructions of the host microprocessor 31. The packet communication signal processing circuits $35_1$ to $35_m$ control the BORSCHTs $34_1$ to $34_m$ provided for the corresponding subscriber lines $33_1$ to $33_m$ in accordance with the instructions of the host microprocessor 31 by way of the local buses $37_1$ to $37_m$ (e.g. battery feed control, ring control, testing control and the like), collect information about the state of lines of each subscriber line $33_1$ to $33_m$ from the BORSCHTs $34_1$ to $34_m$ (e.g. loop scanning of the line, numeral information sent out by the phone and the like), and supply the collected information to the host microprocessor 31.

The analog voice signals are supplied by the subscriber lines for the duration of the call to the packet communication processing circuits $35_1$ to $35_m$ by way of BORSCHTs $34_1$ to $34_m$. The packet communication signal processing circuits $35_1$ to $35_m$ convert the analog voice signals to the digital voice signals by an oversampling analog/digital converter incorporated therein. Furthermore, the packet communication signal processing circuits $35_1$ to $35_m$ subject the converted digital signals to a variety of voice signal processings (e.g. noise mixing elimination, voice or silence discrimination, voice coding, near-end echo elimination and the like) and store the processed digital signals in a memory incorporated therein in an arbitrary packet format. When the data for one packet is stored in the memory, a header is allocated to the packet and a send request flag is made active. The packet communication signal processing circuits $35_1$ to $35_m$ sense a busy signal line BSY at a prescribed timing on the basis of a synchronous signal SYN supplied by the packet switched network and check as to whether the packet data can be transferred to the switch interface circuit 32. If the busy signal BSY is inactive, a packet communication signal processing circuits $35_1$ is allowed to make the busy signal BSY active and transfer its packet data to the switch interface circuit 32 as serial output data SO. The packet communication signal processing circuit $35_1$ to deactivates the busy signal BSY upon competion of the transfer of the packet data. If the busy signal BSY is active, the other packet communication signal processing circuits $35_1$ to $35_m$ avoid transmitting packet data and sense the busy signal BSY at a timing prescribed on the basis of the next synchronous signal SYN. The processings set forth above are repeated until the busy signal BSY becomes inactive.

In contrast, when the switch interface circuit 32 transfers received or addressed packet data to one of the packet communication signal processing circuits $35_1$ to $35_m$, the switch interface circuit 32 first activates a packet data receiving request signal RREQ at the timing assigned to each of the corresponding packet communication processing circuits $35_1$ to $35_m$, whereupon a packet receiving request flag incorporated in the designated one of packet communication signal processing circuits $35_1$ to $35_m$ becomes active. The designated packet communication signal processing circuit $35_1$ to $35_m$ checks the packet receiving request flag at the timing prescribed on the basis of the synchronous signal SYN supplied by the packet switched network. If the packet receiving request flag is active, the designated packet communication signal processing circuit; $35_1$ to $35_m$ receives the packet data from the switching interface circuit 32 and stores it in the memory incorporated therein. The packet communication signal processing circuit deactivates its packet receiving request flag of after reception of the packet data. Thereafter, the packet communication signal processing circuit extracts the received packet data from the internal memory, analyzes the header for subjecting the packet data to various voice signal processings, converts it to the analog voice signal by the oversampling digital/analog converter and supplies the analog voice signal to the corresponding one of subscriber lines $33_1$ to $33_m$ by way of the corresponding one of BORSCHTs $34_1$ to $34_m$.

PACKET COMMUNICATION SIGNAL PROCESSING CIRCUIT

The packet communication signal processing circuits $35_1$ to $35_m$ will be described in more detail with reference to FIG. 6. The arrangement comprises one large-scale integrated circuit(LSI).

Figure 6:
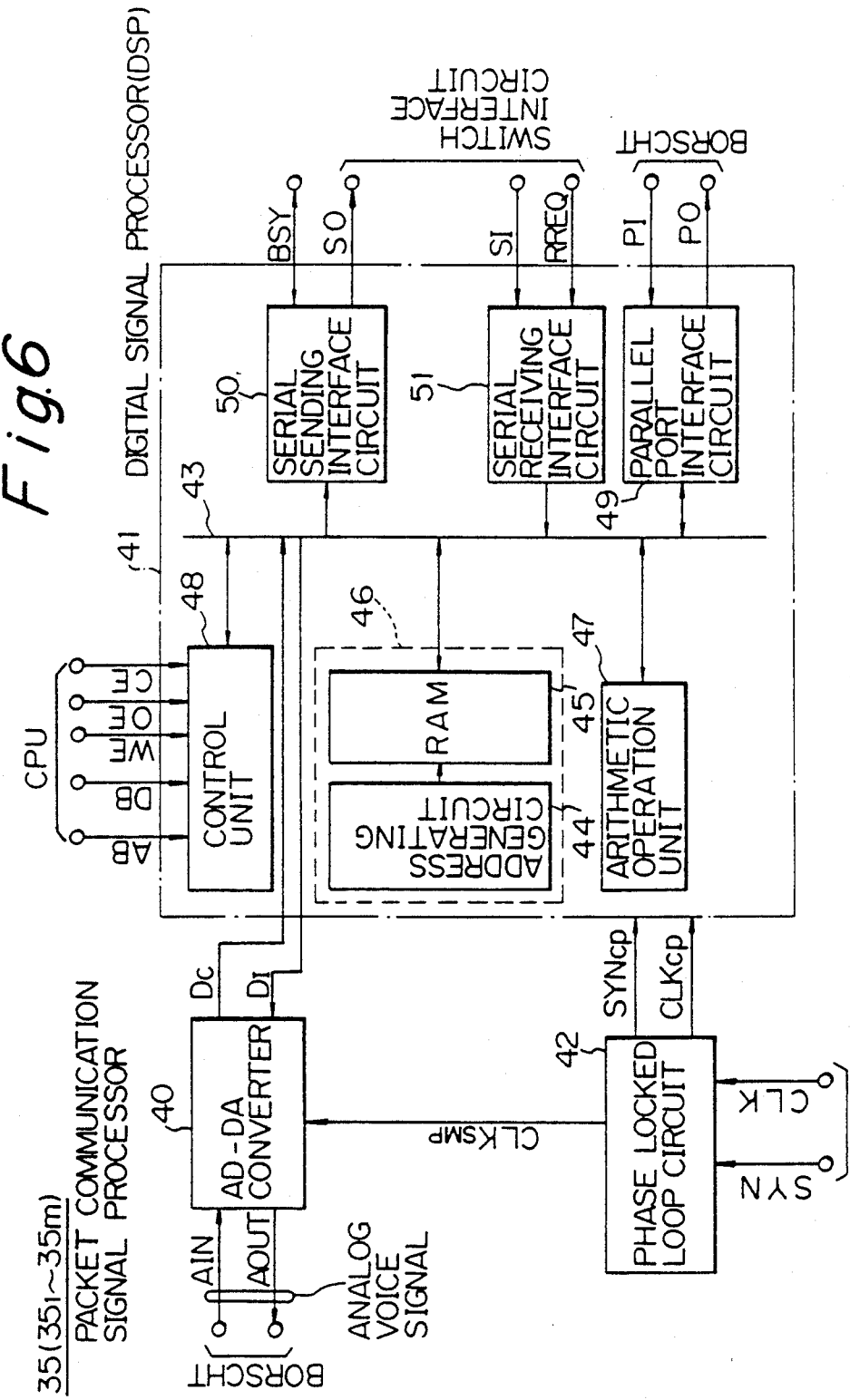
FIG. 6 is a block diagram showing a packet communication signal processing circuit according to the embodiment of the present invention.

In FIG. 6, one of the packet commuinication signal processing circuit $35_1$ to $35_m$ comprises an analog/digital digital/analog converter 40 (hereinafter referred to as AD-DA converter) operable in accordance with an oversampling system, a digital signal processor DSP 41 and a phase locked loop circuit PLL 42.

A synchronous signal SYN and a clock signal CLK are synchronous with the communication network. These signals are supplied from a host device of the subscriber line interface circuit package 30 to the phase locked loop circuit PLL 42. The phase locked loop circuit PLL 42 generates a new synchronous signal SYNCP and two kinds of clock signals CLKCP and CLKSMP, both of which are synchronous with the signal SYN and the clock signal CLK. The signal SYNCP and the clock signal CLKCP are supplied to the digital signal processor 41 and the clock signal CLKSMP is supplied to the AD DA converter 40.

The analog voice signal AIN supplied by one of the BORSCHTs $34_1$ to $34_m$ is sampled at high speed by the AD-DA converter 40 on the basis of the clock signal CLKSMP and converted to a digital signal DC, which is supplied to the digital signal processor 41. On the other hand, a digital signal DI provided by the digital signal processor 41 is converted to an analog signal AOUT by the AD-DA converter 40 on the basis of the clock signal CLKSMP, and thereafter supplied to the BORSHT.

The digital signal processor DSP 41 and the phase locked loop circuit PLL 42 will be described in detail. Inasmuch as the AD-DA converter 40 is not a featured arrangement, the explanation thereof will be omitted.

DIGITAL SIGNAL PROCESSOR (DSP)

The digital signal processor DSP 41 executes call processing or progress and voice signal processing in response to the instructions of the host microprocessor 31, and supplies information obtained by the call progress to the host microprocessor 31.

The digital signal processor DSP 41 comprises, as illustrated in FIG. 6, an address generating circuit 44, a memory 46 having a RAM 45, an arithmetic operation unit 47 and a control unit 48. The memory 46, the arithmetic operation unit 47 and the control unit 48 are respectively connected with each other via an internal data bus 43 so that the data can be transferred to each other. The arithmetic operation unit 47 executes arithmetic operations and logical operations needed for effecting the call progress and the voice signal processing. The control unit 48 is connected with the microprocessor by way of an address bus AB, a bilateral data bus, a signal line for a write enable signal WE, a signal line for a read enable signal OE and a signal line for a chip enable signal (CE). A ROM is not illustrated in FIG. 6 it can be provided along with the RAM 45 in the memory 46.

The digital signal processor DSP 41 is connected with a parallel port interface circuit 49 by way of the internal data bus 43. The parallel port interface circuit 49 is connected with the corresponding one of BORSCHTs $34_1$ to $34_m$ by way of signal lines for a parallel data input P1 and a parallel data output PO for receiving and sending data needed for the call progress, testing, maintenance, supervision and the like. The digital signal processor DSP 41 is further connected by way of the internal bus 43 with a serial sending interface circuit 50 for sending and receiving the packet data to and from the packet switch, and a serial receiving interface circuit 51 for receiving the packet data. The serial sending interface circuit 50 and the serial receiving interface circuit 51 are respectively connected with the other packet communication signal processing circuits $35_1$ to $35_m$ by way of signal lines for sending and receiving the busy signal BSY, for sending the serial output data SO, for receiving the serial input data SI and the receiving request signal RREQ.

PHASE LOCKED LOOP CIRCUIT(PLL)

Figure 7:
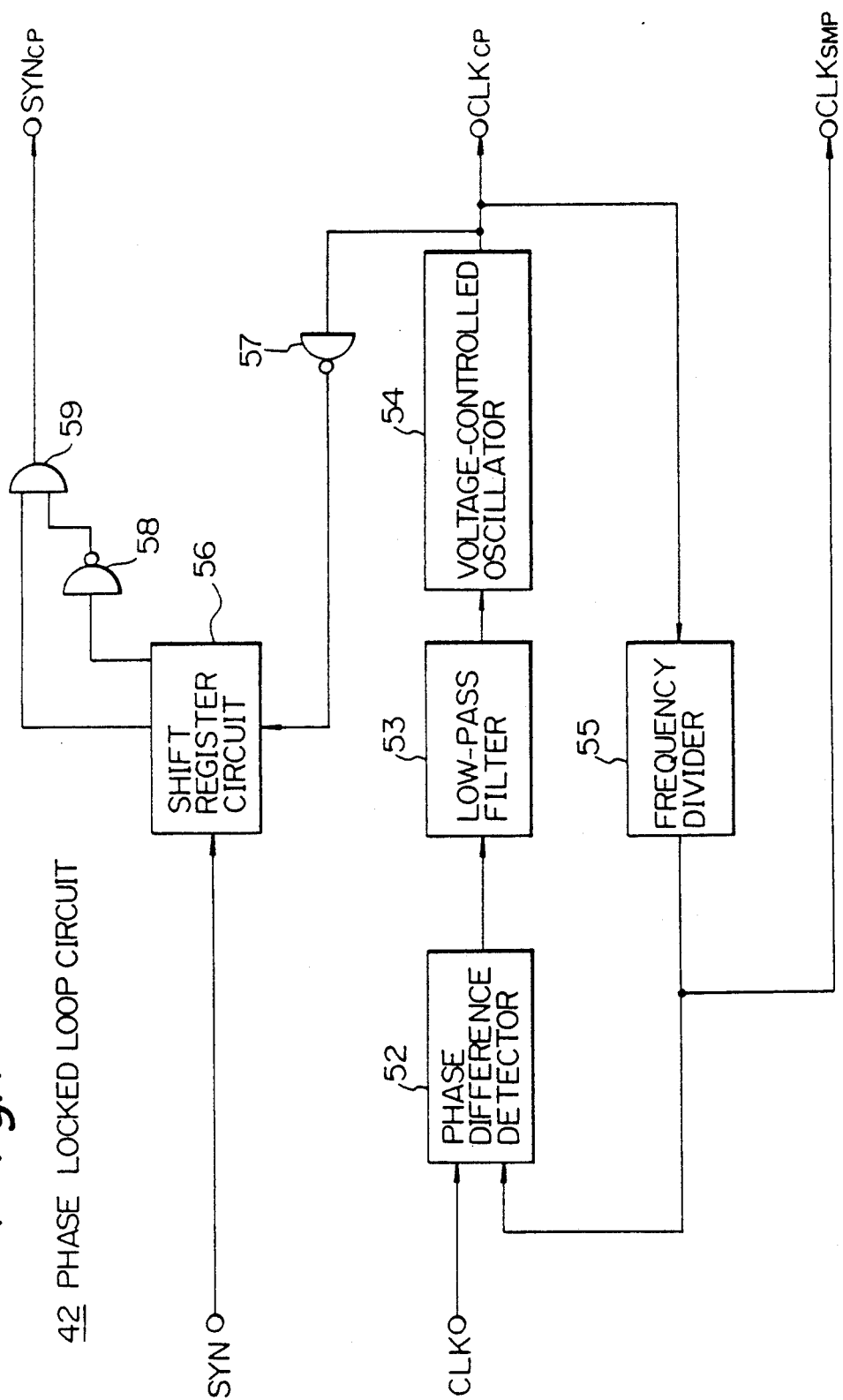
FIG. 7 is a block diagram showing a phase locked loop circuit according to the embodiment of the present invention.
Figure 8:
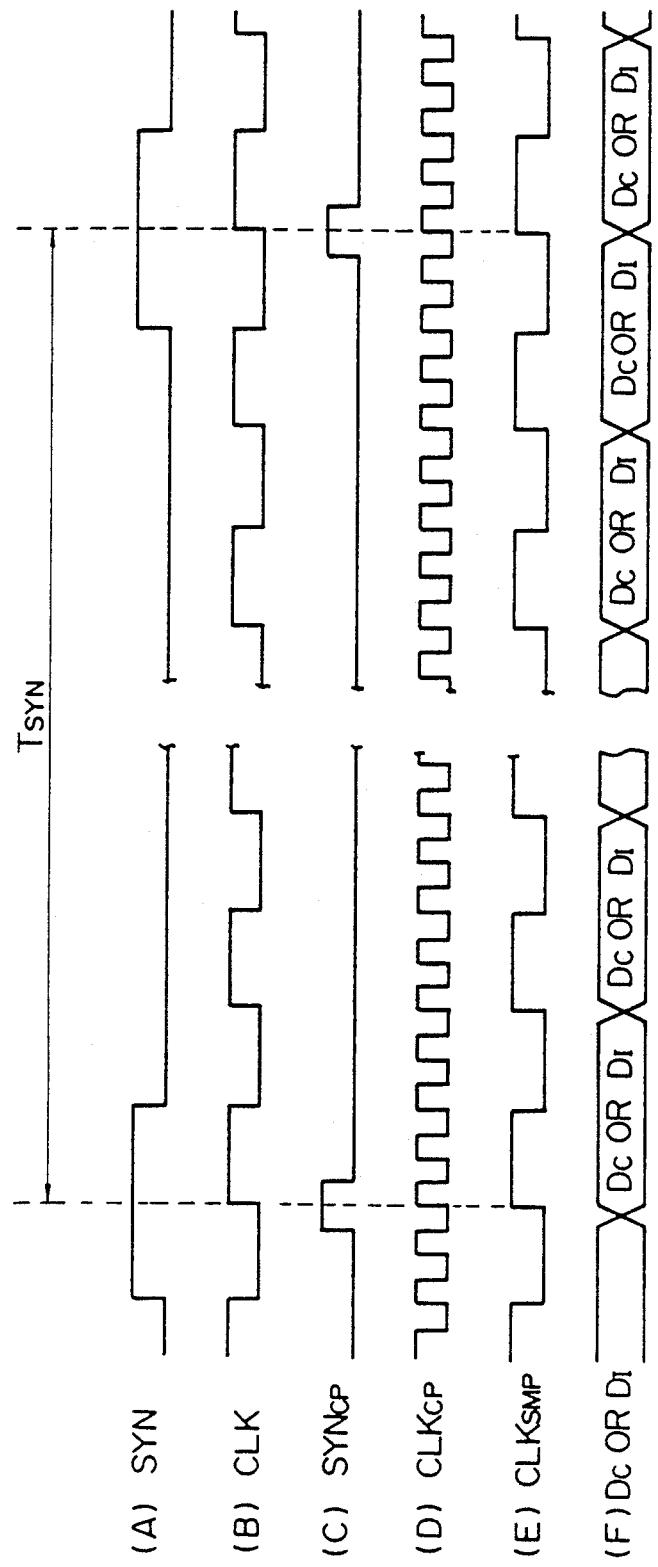
FIG. 8 is a timing diagram of signals at various points in the phase locked loop circuit of FIG. 7.

FIG. 7 is a block diagram showing in detail the phase locked loop circuit PLL 42 as illustrated in FIG. 6, and FIG. 8 is a timing diagram of for the signals.

The phase locked loop circuit PLL 42 comprises, as well known, a phase difference detector 52, a low-pass filter LPF 53, a voltage-controlled oscillator VCO 54 and a frequency divider 55. The phase locked loop circuit PLL 42 further comprises, in addition to the constituents set forth just above, two NAND gates 57, 58 and an AND gate 59.

The voltage-controlled oscillator VCO 54 creates the clock signal CLKCP (FIG. 8(D)) which is supplied to the digital signal processor 41. The frequency of clock signal CLKCP is reduced by a predetermined fraction by the frequency divider 55. The divided frequency is supplied from the frequency divider 55 as a clock signal CLKSMP (FIG. 8 (E)) to the AD-DA converter 40 and to the phase difference detector 52. The clock signal CLK, which is synchronous with the packet switched network, is also supplied to the phase difference detector 52. The phase difference detector 52 generates a pulse corresponding to the phase difference between the clock signal CLKSMP and the clock signal CLK. The phase difference pulse is converted to a direct current signal by the low-pass filter 53 and supplied to the voltage-controlled oscillator 54 as a frequency control signal. The high speed clock signal CLKCP is thus made to be synchronous with the clock signal CLK.

The synchronous signal SYN (FIG. 8(A)) has a pulse width corresponding to one clock cycle of the clock signal CLK and frequency which is twice the bandwidth of the analog voice signal. The phase locked loop circuit PLL 42 creates a synchronous signal SYNCP (FIG. 8(C)) which is sycnchronous with the synchronous signal SYN and supplied to the digital signal processor 41. The shift register circuit 56 receives the synchronous signal SYN as the data and an inverted clock signal CLKCP provided by the NAND gate 57 as the shifting clock signal. The output of the shift register 56 at some shift stage (the second stage in FIG. 8) is directly supplied to the AND gate 59, and the output of the shift register 56 at this shift stage incremented one stage is inverted by the NAND gate 58 and supplied to the AND gate 59. Hence, the AND gate 59 supplies an output synchronous signal CYNCP having a pulse width corresponding to one clock cycle of the clock signal CLKCP to the digital signal processor 41 at the data timing illustrated in FIG. 8(F).

The phase locked loop circuit PLL 42 is included in one LSI constituting the packet communication signal processing circuit 35, so that the arrangement thereof is simplified and and synchronized with the network. If the phase locked loop circuit PLL 42 were provided outside the LSI, there would be serious problem of crosstalk in processing high frequency signals, hence the phase locked loop circuit PLL 42 is included in one LSI.

An overall operation of the packet communication signal processors $35_1$ to $35_m$ will be described hereinafter.

All the operating modes of the packet communication signal processing circuits $35_1$ to $35_m$ are determined by the instructions of the host computer 31. The packet communication signal processing circuits $35_1$ to $35_m$ control their BORSCHTs $34_1$ to $34_m$ by way of the parallel port interface circuits 49 on the basis of the instructions of the host microprocessor 31 (battery feed control, ringing control, testing control) and collect the line states from the BORSCHTs (e.g. loop scanning of the lines, numerical information sent out from the phone), and then convey the collected information to the host microprocessor 31.

The voice analog signal AIN provided by one of the BORSCHTs 34 for the duration of a call is converted to a digital signal by the AD-DA converter 40 and supplied to the digital signal processor 41. The digital signal is subjected to various voice signal processings (e.g. noise mixing elmination, voice or silence discrimination, voice coding, near-end echo elmination and the like) and stored thereafter in the memory 46 in an arbitrary packet format. When the data for one packet has been stored in the memory 46, the digital signal processor 41 allocates a header to the packet and transfers the packet to the switch circuit at high speed by way of the serial sending interface circuit 50.

On the other hand, a received packet transferred from the switch circuit by way of serial receiving interface circuit 51 is temporarily stored in the memory 46. Thereafter, the digital signal processing processor 41 extracts the received packet data from the memory 46, analyzes the header and subjects the packet data to various voice signal processings, after which the data is supplied to the AD-DA converter 40. The packet data is subjected to digital/analog conversion by the AD-DA converter 40 and supplied to the BORSCHT as the analog voice signal AOUT.

The address generating circuit 44, the serial receiving interface circuit 51, the serial sending interface circuit 50 and the parallel port interface circuit 49 respectively constituting the digital signal processor 41 will be described more in detail hereinafter.

The arithmetic operation unit 47 comprises an arithmetic and logic unit ALU, a multiplier, register, an accumulator ACC, and the like. The control unit 48 comprises an instruction register and the like. However, neither the arithmetic operation unit 47 nor the control unit 48 need to be further explained.

ADDRESS GENERATING CIRCUIT

Figure 9:
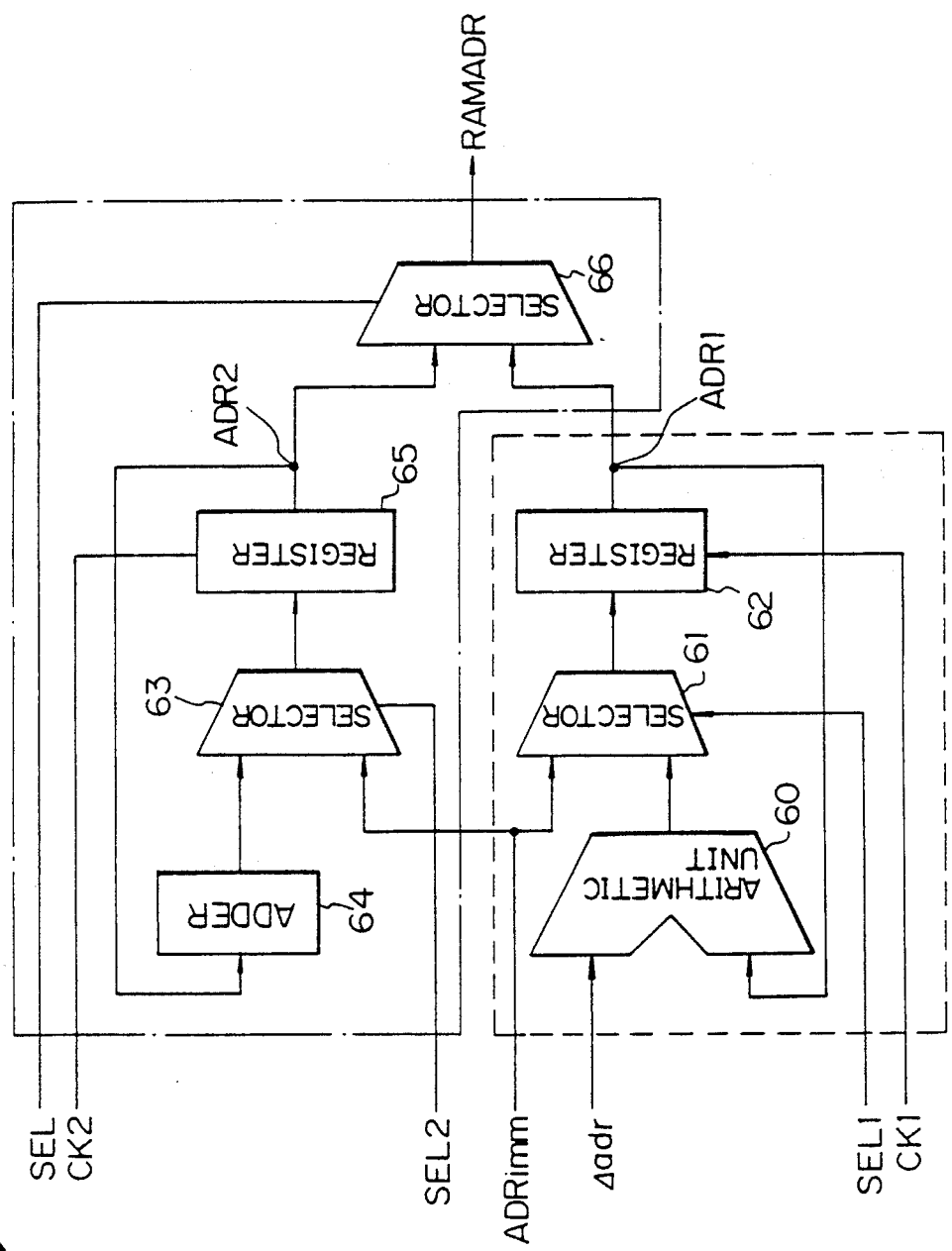
FIG. 9 is a block diagram showing an address generating circuit according to the embodiment of the present invention.

FIG. 9 is a block diagram showing an arrangement of the address generating circuit 44

The address generating circuit 44 has an arithmetic unit 60 for adding a first address signal ADR1 to an address varing signal $\Delta$adr. The output signal of the arithmetic unit 60 is supplied to the input of a selector 61 together with an immediate addressing signal ADRimm for determining the initialization. The selector 61 selects the immediate addressing signal ADRimm or the output of the arithmetic unit 60 on the basis of a selection signal SEL1 and has an output connected to a register 62. The register 62 stores the output of the selector 61 and provides the first address signal ADR1 on the basis of the synchronization with a latch clock signal CK1.

A selector 63 selects the output of an adder 64 or the immediate addressing signal ADRimm on the basis of a selection signal SEL2, and has an output connected to a register 65. The register 65 stores temporarily the output of the selector 63 and provides a second address signal ADR2 on the basis of the synchronization of a latch clock signal CK2. The second address signal ADR2 is supplied commonly to the input of the adder 64 and to one input of a third selector 66.

The adder 64 adds 1 to the second address signal ADR2. The selector 66 selects one of the first address signal ADR1 and the second address signal ADR2 and provides an address output signal RAMADR.

The second address signal ADR2 is a signal to get access to the RAM 45 at the time of transfer of the packet data and the first signal ADR is a signal to get access to a RAM 45 at the time when the packet data is not transferred.

The operation of the address generating circuit 44 will be described with reference to FIG. 10, which shows the transfer of a packet.

The voice input signal is, before transfer of the packet, first converted to the packet data format and stored in the RAM 45.

When a packet has been stored in the RAM 45, a flag for requesting sending of the packet (SREQF in FIG. 13, which will be described later) is set, whereby the select signal SEL of the selector 66 is controlled to select the second address signal ADR2. Assuming that the first address location for transferring the packet data has previously been determined and the initial address thereof has been stored in the register 65 as a result of the immediate address signal ADRimm, the address signal ADR2 is supplied as the address output signal RAMADR to the RAM45. As a result, the packet data corresponding to the second address signal ADR2 is read and transferred to the serial sending interface circuit 50. At the same time, the latch clock signal CK2 is supplied to the register 65, which stores the value obtained by adding 1 to the present address. Therefore, the select signal SEL of the selector 60 is controlled to select the first address ADR1, whereby the digital signal processor 41 returns to execute processings other than the tranfer of the packet.

Figure 10:
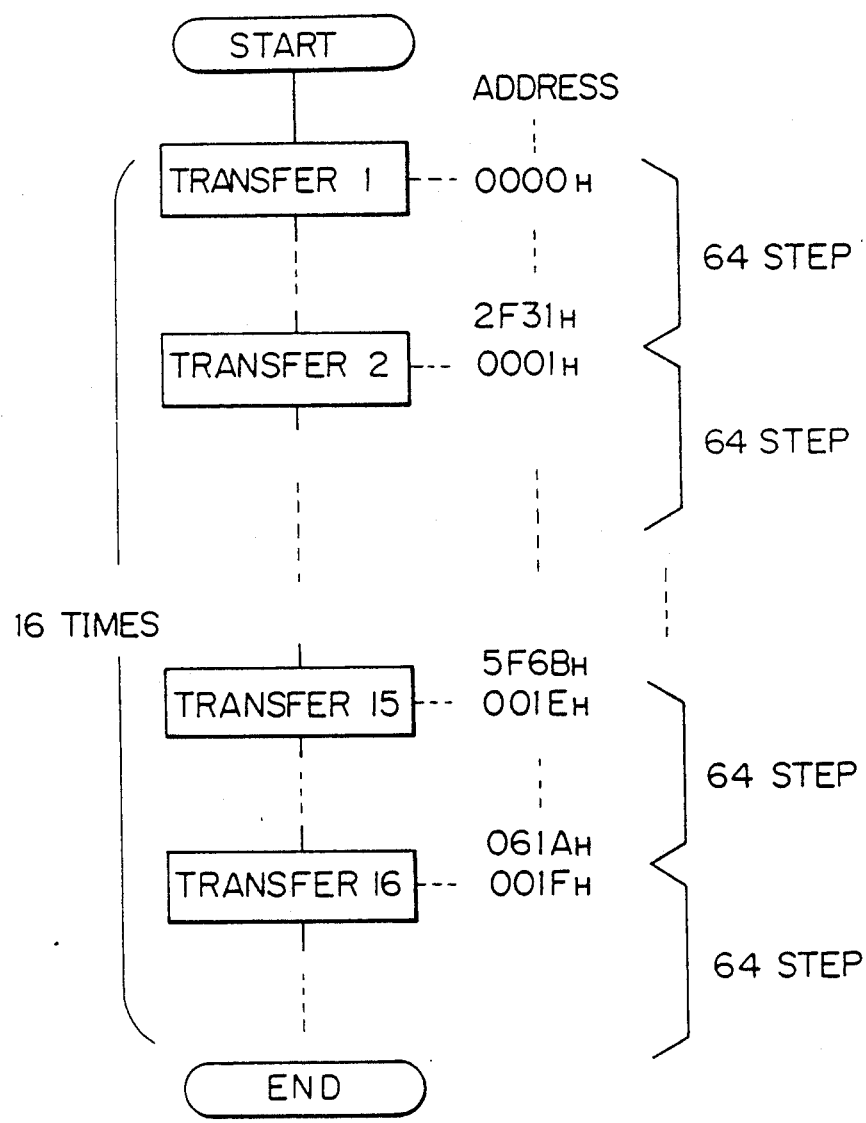
FIG. 10 is a flow chart which is provided for assistance in explaining the process of transferring a the packet according to the embodiment of the present invention.

Assuming that the processing speed by the digital signal processor 41 relatative to that by the serial sending interface circuit 50 is 1:64, the packet data is transmitted from the RAM 45 to the serial sending interface circuit 50 by a transfer order every 64 steps as illustrated in FIG. 10.

The flow chart of FIG. 10 shows the transfer operations of the for packet data having 16 words, namely, transfer operations repeated 16 times. For example, at Transfer 1, the data stored at the address 0000H of the RAM 45 is first read and supplied to the serial sending interface circuit 50. Upon completion of the transfer of the packet in Transfer 1, the digital signal processor 41 starts to process other signals. Upon completion of processing of the signal located at the address 2F31H of the RAM 45 at the 64th step, a second packet transfer, Transfer 2, starts. Thereafter the transfer operations are repeated until Transfer 16 is completed.

In case of reception of the packet data, a flag for requesting reception of the packet (RREFG in FIG. 11) is set and, the packet data is successively transferred to and stored in the RAM 45. Thereafter the packet data is subjected to a reproduction procesing and supplied to the AD-DA converter 40, whereby the analog voice output signal is produced.

SERIAL RECEIVING INTERFACE CIRCUIT

Figure 11:
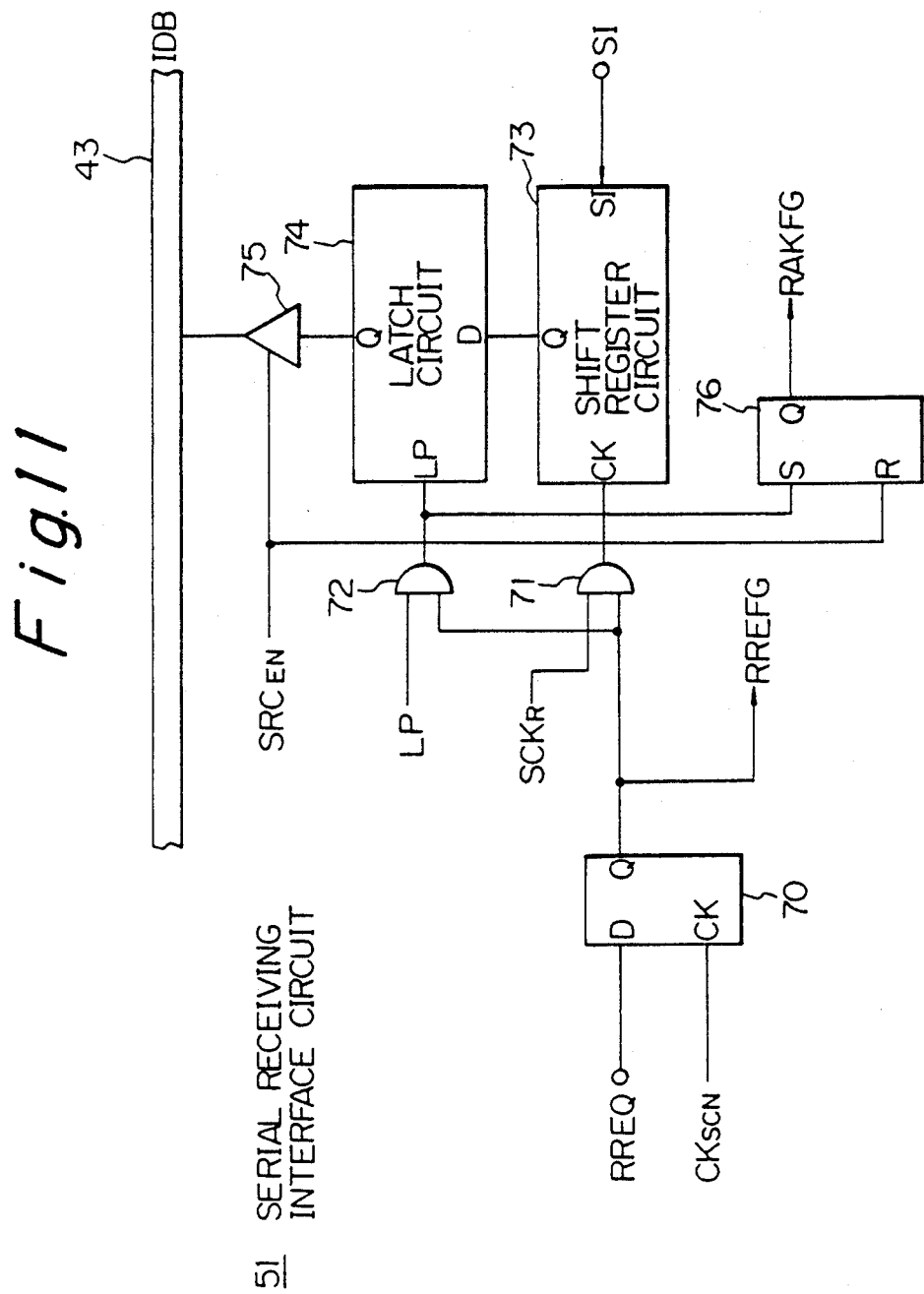
FIG. 11 is a block diagram showing a serial receiving interface circuit according to the embodiment of the present invention.
Figure 12:
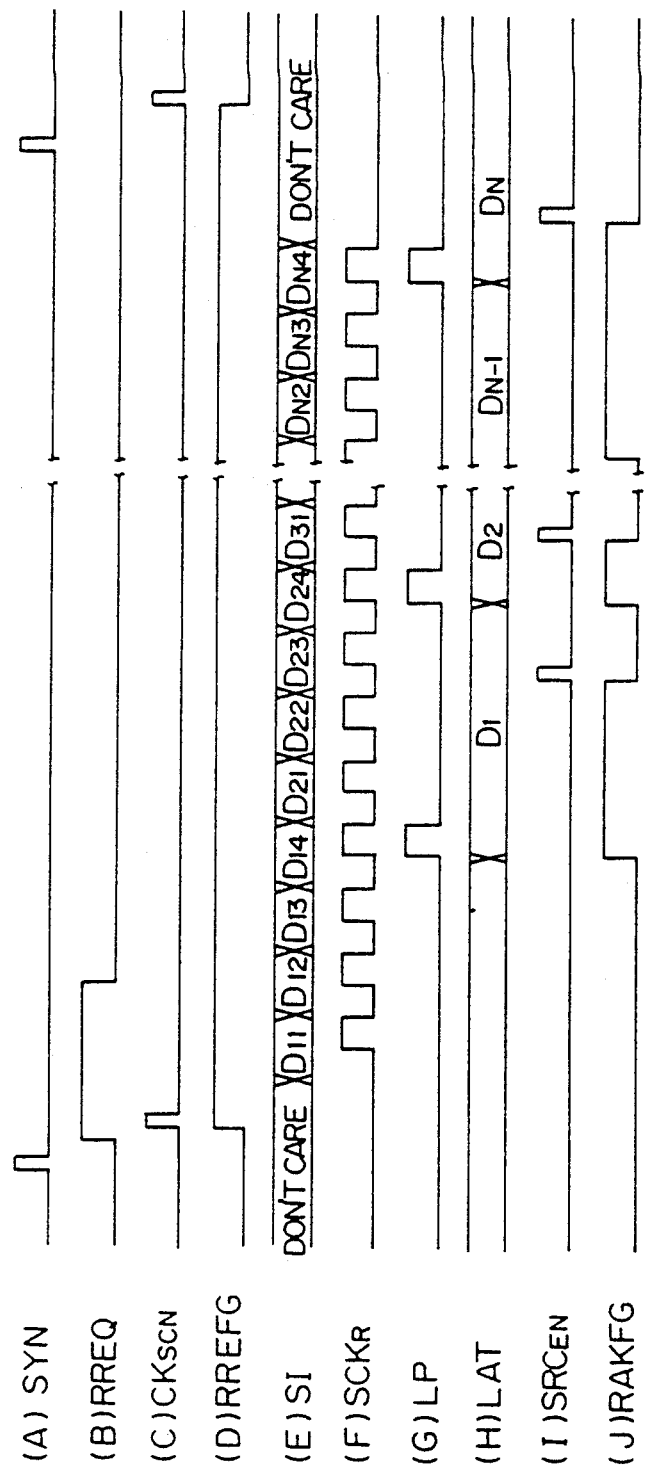
FIG. 12 is a timing diagram of signals at various points in the serial receiving interface circuit in FIG. 11.

The serial receiving interface circuit 51 will now be described in detail with reference to FIG. 11 and FIG. 12.

The serial receiving interface circuit 51 comprises a D-type flipflop circuit 70, AND gates 71 and 72, a shift register 73, a latch circuit 74, a three-state buffer circuit 75 and an RS flipflop circuit 76. Serial receiving interface circuit 51 converts a serial receiving packet to a parallel receiving packet and supplies the parallel receiving packet to the internal data bus 43.

The receiving request signal RREQ (FIG. 12(B)), which becomes active when the packet data is supplied to the subscriber line interface circuit, is supplied to the digital signal processor circuit 41. The receiving request signal RREQ is supplied to the data terminal of the D-type flipflop circuit 70. A clock pulse signal CKSCN (FIG. 12(C)) having the same period (hereinafter referred to as a frame) as the synchronous signal SYN (FIG. 12(A)) is supplied to the clock terminal of the D-type flipflop 70. The receiving request signal RREQ is sampled by the clock pulse signal CKSCN in the D-type flipflop circuit 70 and a the receiving request flag RREFG (FIG. 12(D)) is set. The receiving request flag RREFG is supplied to the control unit 48 of the digital signal processor 41 as notification of a receiving request from external equipment and to the AND gates 71 and 72 as a passage control signal.

A shift clock pulse signal SCKR (FIG. 12(F)), passes the AND gate 71 when it operates and is supplied to the shift register 73, e.g. the clock signal CLKCP, has the same number of pulses in one frame thereof as the number of bits constituting a packet. A latch pulse signal LP (FIG. 12(G)), which passes the AND gate 72 when it operates and is supplied to the latch circuit 74, is generated every given number of bits in synchronism with the shift clock pulse signal SCKR.

The shift register circuit 73 converts a serial input to a parallel output. It receives a serial receiving data SI (FIG. 12(E)) during a packet receiving operation on the basis of the shift clock pulse signal SCKR passed by the AND gate 71. The data received by the shift register circuit 73 and converted to a parallel output is supplied to a data terminal D of the latch circuit 74. The latch circuit 74 latches the output of the shift register circuit 73 on the basis of the latch pulse signal LP provided by the AND gate 72 and supplies the latch output LAT (FIG. 12(H)) to the three-state buffer circuit 75.

The RS flipflop 76 receives the output LP of the AND gate 72 at its set terminal S and is set at the instant when the latch circuit 74 latches the output of the shift register 73. The RS flipflop 76 supplies a receiving acknowledge flag RAKFG (FIG. 12(J)) from its output terminal Q to inform the control unit 48 of the digital signal processor 41 of the completion of the receipt of part of a packet.

While the receiving acknowledge flag RAKFG is active, a source enable signal SRCEN (FIG. 12(I)) indicative of a reception enable state relative to a signal source becomes active. The source enable signal is supplied to to the control terminal of the three-state buffer circuit 75 and a reset terminal R of the RS flipflop circuit 76. When the source enable signal SRCEN is active, the output data of the latch circuit 74 is supplied to the internal data bus 43 and the RS flipflop circuit 76 is reset to deactivate the receiving acknowledge flag RAKFG so that the RS fipflop 76 is ready for shift register 73 to receive the next data of a given number of bits.

The operations are repeated until the data for one packet is received.

SERIAL SENDING INTERFACE CIRCUIT

Figure 13:
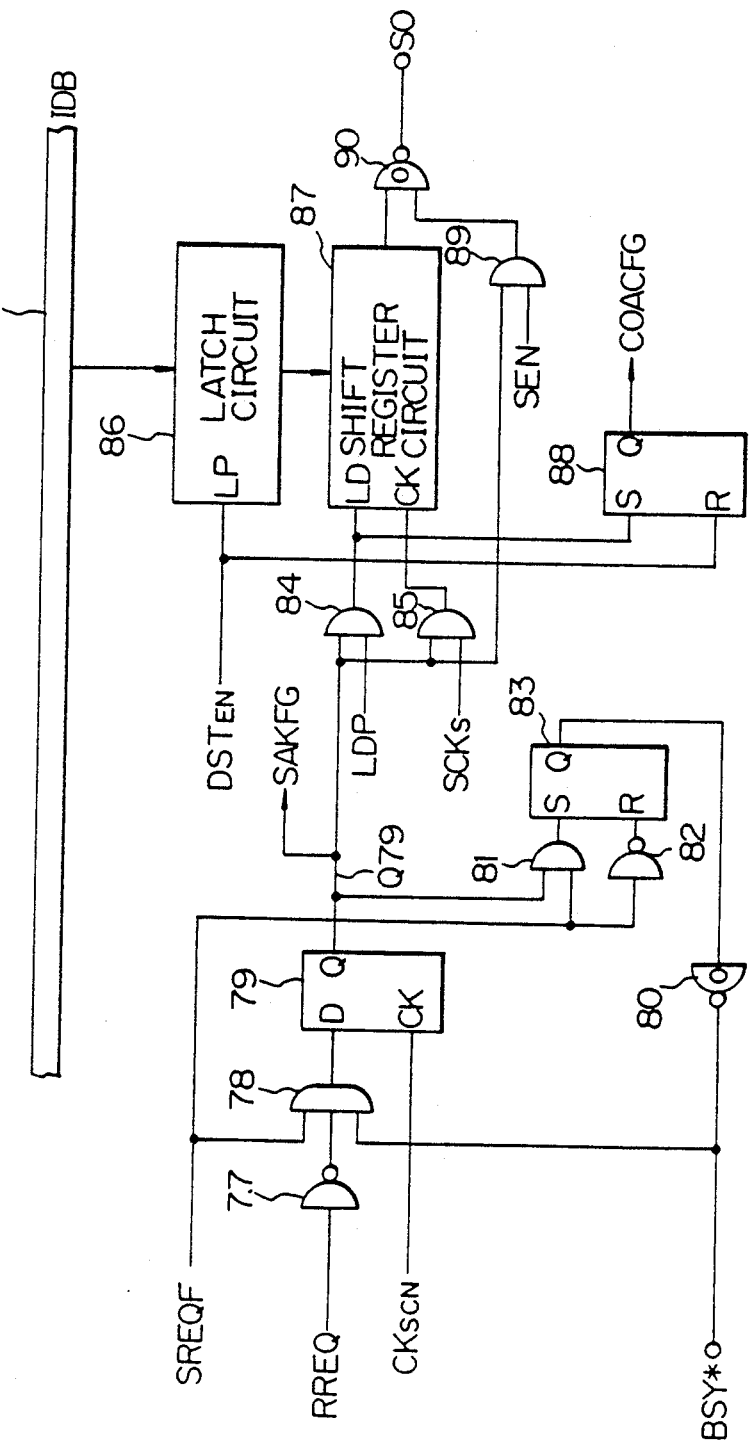
FIG. 13 is a block diagram showing a serial sending interface circuit according to the embodiment of the present invention.

The serial sending interface circuit 50 will now be described with reference to FIG. 13 and FIG. 14.

The serial sending interface circuit 50 comprises NAND gates 77 and 82, AND gates 78, 81, 84, 85 and 89 a D-type flipflop circuit 79, an open collector (or drain) NAND gate 80, RS flipflop circuits 83 and 88, a latch circuit 86, a shift register circuit 87 and an open collector (or drain) NAND gate 90. Serial pending interface circuit 50 converts the parallel data supplied via the internal data bus 43 to serial data which is supplied to the switch interface circit 32 as the addressing or sending packet.

The reeiving request signal RREQ (FIG. 14(B)), as explained in connection with the serial receiving interface circuit 51, is also supplied to the serial sending interface circuit 50. This serves as a conflic control provision for stopping a serial sending operation at the time of a serial receiving operation. The receiving request signal RREQ is inverted by the NAND gate 77 and supplied to the AND gate 78.

The sending request flag SREQF (FIG. 14(C)) becomes active when an addressing packet is stored in the memory of the digital signal processor 41 for one packet and becomes inactive upon completion of the sending of the packet. The sending request flag SREQF is supplied to the AND gates 78 81 and to the NAND gate 82.

A busy signal BSY (FIG. 14(D)) provided by the output Q of the RS flipflop 83 is a conflic signal that is necessary for use in the multiconnection arrangement of the packet communication signal processing circuits $35_1$ to $35_m$ as shown in FIG. 5. The busy signal is inverted to an active low signal BSY (indicating active low) by the NAND gate 80 and supplied to the and gate 78 and to the other packet communication signal processor circuits $35_1$ to $35_m$. As mentioned above, the conflict control is necessary since that the packet communication signal processing circuits $35_1$ to $35_m$ are provided in a''; multiconnection arrangement. The busy terminals of the packet communication signal processing circuits $35_1$ to $35_m$ are multiconnected (wire ORed) and pulled up by an external resistor (not shown). The digital signal processor 41 scans the inverted busy signal BSY to ascertain whether none of the packet communication signal processing circuits 35₁ to 35ₘ is executing a transmission operation and sending packet data. That is, if the busy signal BSY is "H", the digital signal processor 41 allows the busy signal BSY to become "L" so that the packet communication signal processing circuits 35₁ to 35ₘ cam can not start to send a packet, except by the concerned one of circuits 35₁ to 35ₘ, which can thereafter transmit its packet. The digital signal processor 41 makes the busy signal BSY to return to "H" upon completion of the transmission of the packet.

The clock pulse signal CKSCN (FIG. 14(E)) has the same frame duration as the synchronous signal SYN (FIG. 14(A)) and is supplied to the clock terminal CK of the D-type flipflop circuit 79.

The D-type flipflop circuit 79 samples the output of the AND gate 78 and supplies its Q output to the AND gates 81, 84, 85 and 89. The Q output also serves as a sending acknowledge flag SAKFG (FIG. 14(F)) and informs the control unit 48 of the digital signal processor 41 that the packet can be transmitted. The active condition of the sending acknowledge flag SAKFG indicates that, due to logical condition of the AND gate 78, (1) there is a sending request for a packet (2) there is no receiving request for a packet and (3) other packet communication signal processing circuits excepting the concerned circuit are not transmitting a packet.

The RS flipflop circuit 83 receives at its set terminal S the output of AND gate 81, which is produced when the sending request flag SREQF and the sending acknowledge flag SAKFG (Q79) are ANDed by gate 81. The RS flipflop circuit 83 receives at its reset terminal R the inverted sending request flag SREQF from the NAND gate 82. The Q output of RS flipflop circuit 83 is inverted by the open collector NAND gate 80 to form the busy signal BSY.

That is, when the sending acknowledge flag SAKFG becomes active, the RS flipflop circuit 83 is set so that the inverted busy signal BSY is "L" and informs the other packet communication signal processing circuits 35₁ to 35ₘ that a packet is now being transmitting. When the sending acknowledge flag SAKFG becomes inactive, the flipflop circuit 83 is reset so that the inverted busy signal BSY is returned to "H".

Figure 14:
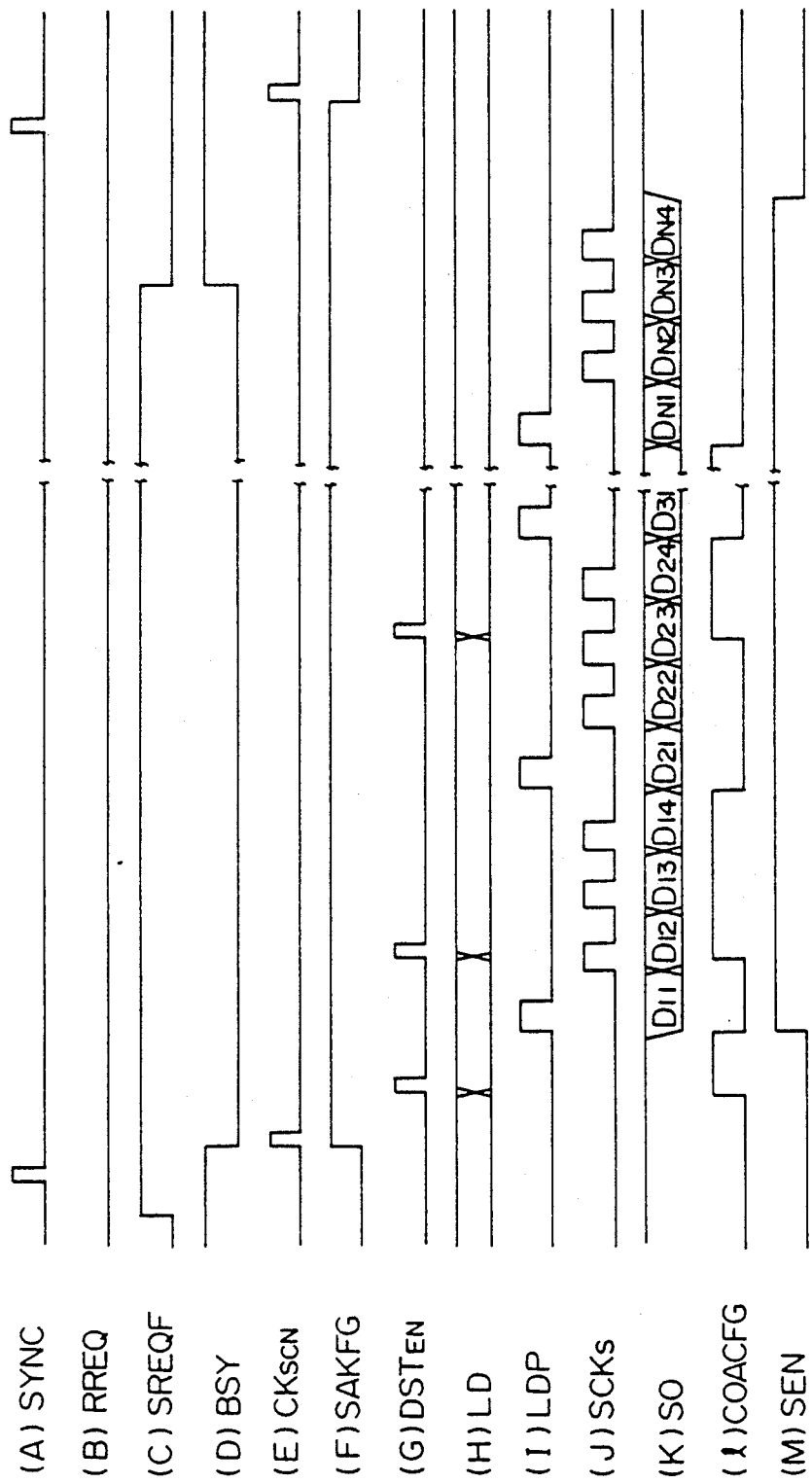
FIG. 14 is a timing diagram of signals at various points in the serial sending interface circuit in FIG. 13.

A destination enable signal DSTEN (FIG. 14(G)) is supplied from the digital signal processor 41 to the latch circuit 86 and the RS flipflop 88. When the control unit 48 of the digital signal processor 41 designates the latch circuit 86 as the destination at the time of execution of the transfer instruction order, the destination enable signal DSTEN becomes active and at the same time the RS flipflop circuit 88 is reset. At this time, the Q output of the RS flipflop circuit 88 is provided as a transfer acknowledge flag COACFG (FIG. 14 (l )). The transfer acknowledge flag COACFG keeps inactive until the data latched by the latch circuit 86 is loaded into the shift register circuit 87 and informs the control unit 48 of the digital signal processor 41 that the latch circuit 86 is now operated.

A shift clock pulse signal SCKS (FIG. 14(J)) has the same number of pulses as the number of bits constituting in one frame of a packet. The signal SCKS is supplied to the AND gate 85 which is operable by reception of the sending acknowledge flag SAKFG. A load pulse signal LDP (FIG. 14(I)) is supplied to the AND gate 84, which is operable by reception of the sending acknowledge flag SAKFG. The shift register circuit 87 is used as a parallel input and a serial output device. It receives the load pulse signal LDP from the AND gate 84 at the given timing when the packet data is transmitted, thereby loading the latched data of the latch circuit 86 (FIG. 14(H)). At the same time, the RS flipflop circuit 88 is set so that the transfer acknowledge flag COACFG becomes active and informs the control unit 48 of the digital signal processor 41 that the latch circuit 86 is not to be operated. The shift register circuit 87 receives the shift clock signal SCKS from the AND gate 85 at the given timing and supplies the data in the shift register circuit 87 to the open collector NAND gate 90 to provide a serial output (FIG. 14(K)).

A sending enable signal SEN (FIG. 14(M)) is supplied from the control unit 48 to the AND gate 89. The sending enable signal SEN has a cycle corresponding to one frame and becomes active during the period when the shift register 87 provides the packet data. Hence, when the sending acknowledge flag SAKFG becomes active, the output of the AND gate 89 allows the open collector NAND gate 90 to operate. As a result, the serially converted packet data is supplied to the switch interface circuit 32. The serial sending data SO is pulled up by an external resistance (not shown) since it is the output of the open collector NAND gate 90.

The operations are repeated until the data for one packet is transmitted.

PARALLEL PORT INTERFACE CIRCUIT

Figure 15:
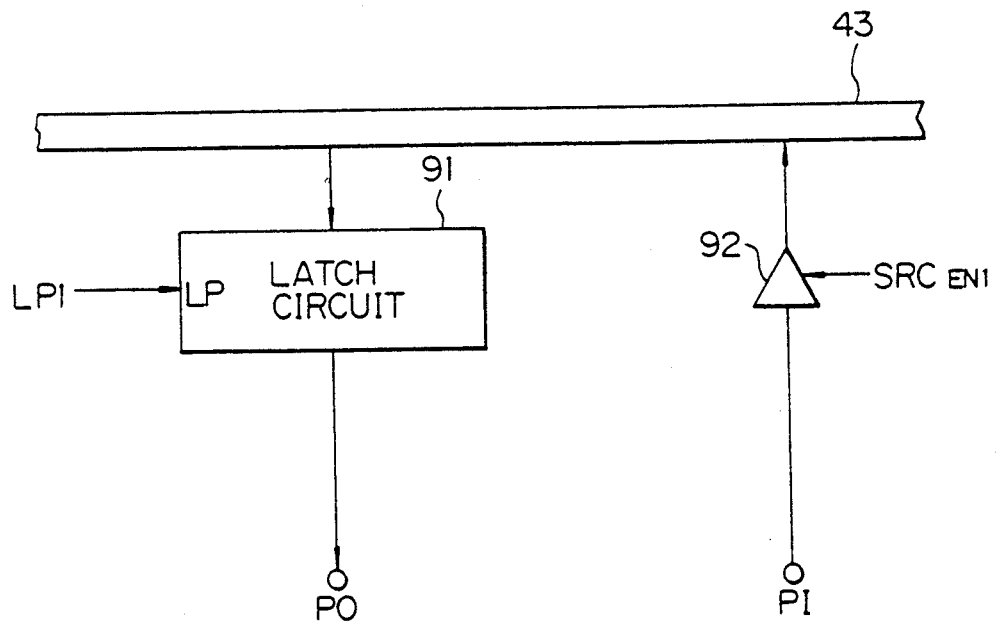
FIG. 15 is a block diagram showing a parallel port interface circuit according to the embodiment of the present invention.

The parallel port interface circuit 49 will now be described in more detail with reference to FIG. 15.

The parallel port interface circuit 49 comprises a latch circuit 91 and a three-state buffer circuit 92. Circuit 49 latches the data from the internal bus 43 of the digital signal processor 41 at the timing of the latch pulse signal LP1 and supplies it to the BORSCHTs. The parallel port interface circuit 49 also takes the data from the BORSCHTs into the internal data bus 43 by way of the three-state buffer circuit 92, which is operable by a source enable signal SRCEN1.

What is claimed is:

1. A subscriber line interface circuit in a switching system for a communication network, comprising:
    a plurality of line terminal circuit means for subjecting subscriber lines to terminal processing;
    a switch interface circuit connected to a switch circuit of the switching system;
    a plurality of digital signal processor means, each corresponding to a respective one of the line terminal circuit means, for assembling and disassembling packets, processing voice signals, controlling the corresponding line terminal circuit means, and effecting contention control of the transmission and reception of packet data in synchronism with the communication network, each of the digital signal processor means including
        memory means for storing data from the corresponding line terminal circuit means and for storing receiving packet data in order to assemble or disassemble a packet.
        address generating circuit means for generating address signals for the memory means,
        serial receiving interface means for converting serial receiving packet data supplied by the switch interface circuit to parallel data which is supplied to the memory means,
        serial sending interface circuit means for converting parallel sending packet data stored in the memory means to serial data which is supplied to the switch interface circuit, and parallel port interface circuit means connected with the corresponding line terminal circuit means for supplying a control signal to the corresponding line terminal circuit means and receiving information from the corresponding line terminal circuit means; and central processing unit means for controlling the plurality of digital signal processor means.

2. A subscriber line interface circuit in a switching system according to claim 1, further comprising:

a plurality of AD-DC converter means for converting an analog signal supplied by a line terminal circuit means into a digital signal which is supplied to the corresponding digital signal processor means and converting a digital signal supplied by a digital signal processor means to an analog signal which is supplied to the corresponding line terminal circuit means; and a plurality of phase locked loop circuit means for supplying a signal synchronous with the communication network to the digital signal processor means.

3. A subscriber line interface circuit in a switching system according to claim 1, wherein the parallel port interface circuit means of a digital signal processor means is connected with the corresponding line terminal circuit means by a local bus through which the digital signal processor means controls the corresponding line terminal circuit means.

4. A subscriber line interface circuit in a switching system according to claim 2, wherein a digital signal processor means, an AD-DA converter means, and a phase locked loop circuit means are constituted by one large-scale integrated circuit.

5. A subscriber line interface circuit in a switching system according to claim 2, wherein the AD-DA converter means is constituted in accordance with an oversampling system.

6. A subscriber line interface circuit in a switching system for converting an analog signal supplied by a subscriber line to digital packet data which is supplied to a switch circuit of the switching system and for converting digital packet data supplied by the switch circuit into an analog signal which is supplied to the subscriber line, comprising:

memory means for storing the packet data and other data; and address generating circuit means for generating a first address signal for getting access to the memory means at a time when packet data is not being transferred and a second address signal for getting access to the memory means at the time of transfer of the packet data, said address generating circuit means including (a) a first register means for holding and providing the first address signal;

(b) an arithmetic unit means for receiving the first address signal and an address change signal relative to the first address signal and effecting arithmetic combination thereof;

(c) a first selector means for selecting the output of the arithmetic unit means or a predetermined address signal of the packet data and supplying the selected output or the predetermined address signal to the first register means;

(d) a second register means for holding and providing the second address signal;

(e) an address incrementing means for incrementing the second address signal;

(f) a second selector means for selecting the output of the address incrementing means or the predetermined address signal and supplying the selected output or the predetermined address signal to the second register means; and (g) a third selector means for selecting the first address signal or the second address signal.

* * * * *